United States Patent
Tanabe et al.

(10) Patent No.: US 10,072,102 B2
(45) Date of Patent: Sep. 11, 2018

(54) PHOSPHORIC ACID-MODIFIED POLYMER

(71) Applicant: THE YOKOHAMA RUBBER CO., LTD., Minato-ku, Tokyo (JP)

(72) Inventors: Yusuke Tanabe, Hiratsuka (JP); Ryutaro Nakagawa, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 15/519,027

(22) PCT Filed: Dec. 23, 2015

(86) PCT No.: PCT/JP2015/079974
§ 371 (c)(1),
(2) Date: Apr. 13, 2017

(87) PCT Pub. No.: WO2016/063975
PCT Pub. Date: Apr. 28, 2016

(65) Prior Publication Data
US 2017/0240656 A1    Aug. 24, 2017

(30) Foreign Application Priority Data
Oct. 24, 2014   (JP) ................................. 2014-217425

(51) Int. Cl.
*C08C 19/24* (2006.01)
*C08F 36/08* (2006.01)
*C08F 36/06* (2006.01)

(52) U.S. Cl.
CPC .............. *C08C 19/24* (2013.01); *C08F 36/06* (2013.01); *C08F 36/08* (2013.01)

(58) Field of Classification Search
CPC ....................................................... C08C 19/24
See application file for complete search history.

(56) References Cited

U.S. PATENT DOCUMENTS

| 6,127,327 A | 10/2000 | Camenzind et al. |
| 2016/0222418 A1 | 8/2016 | Miyagi et al. |

FOREIGN PATENT DOCUMENTS

| JP | 63-000342 A | 1/1988 |
| JP | H04-218581 A | 8/1992 |
| JP | H05-310820 A | 11/1993 |
| JP | H10-182733 A | 7/1998 |
| JP | H11-60631 A | 3/1999 |
| JP | 2001-081271 A | 3/2001 |
| JP | 2002-179896 A | 6/2002 |
| JP | 2012-036360 A | 2/2012 |
| WO | 2014/198659 A1 | 12/2014 |

OTHER PUBLICATIONS

Brosse, Journal of Applied Polymer Science, vol. 78, p. 1461-1477 (2000) (Year: 2000).*
Office Action dated Jul. 25, 027 issued to the corresponding Japanese Patent Application No. 2014-217425 with a partial English translation thereof.
Inifant'yev, E. Ye, "Hydrophosphorylation of Synthetic Rubbers", Polymer Science U.S.S.R., 1983, vol. 25, No. 2, pp. 472-479.

* cited by examiner

*Primary Examiner* — Robert C Boyle
(74) *Attorney, Agent, or Firm* — Carrier Blackman & Associates, P.C.; Joseph P. Carrier; Fulchand P. Shende

(57) ABSTRACT

The present invention is to provide a polymer which has a C—P bond. The present invention can provide a phosphoric acid-modified polymer having a double bond, and a phosphorus substituent containing a phosphorus atom that directly bonds to a carbon atom.

6 Claims, 1 Drawing Sheet

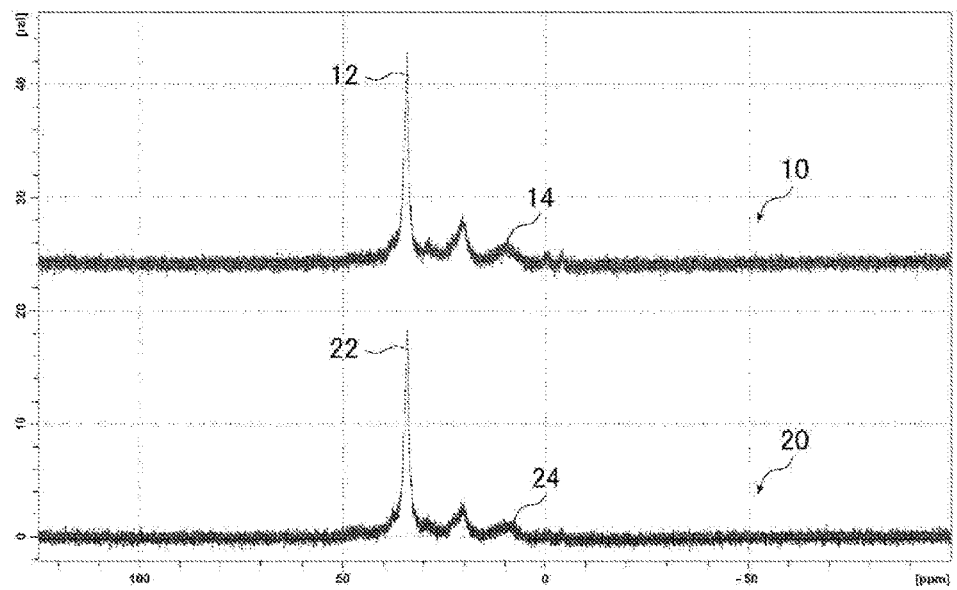

PHOSPHORIC ACID-MODIFIED POLYMER

TECHNICAL FIELD

The present invention relates to a phosphoric acid-modified polymer.

BACKGROUND ART

Conventionally, to impart novel characteristics to characteristics inherent to rubbers, introduction of a functional group into a rubber molecule has been known. For example, Patent Document 1 describes an isoprene oligomer formed from a trans structural moiety and a cis structural moiety, the isoprene oligomer being represented by a particular formula; at least one atom or atomic group contained in the trans structural moiety is substituted by another atom or atomic group; as well as a polyisoprene formed from a trans structural moiety and a cis structural moiety, the polyisoprene being represented by a particular formula; at least one atom or atomic group contained in the trans structural moiety is substituted by another atom or atomic group. In Patent Document 1, the isoprene oligomer or the polyisoprene bonds to a phosphate at its terminal. The carbon atom at the terminal of the isoprene oligomer or the polyisoprene bonds to a phosphorus atom via an oxygen atom.

CITATION LIST

Patent Literature

Patent Document 1: Japanese Unexamined Patent Application Publication No. 2012-36360A

SUMMARY OF INVENTION

Technical Problem

However, it is conceived that the phosphate having carbon atom-oxygen atom-phosphorus atom (C—O—P bond) has lower thermal stability and water resistance, acid resistance, and base resistance due to its capability to undergone hydrolysis, compared to those of the case of a C—P bond in which a carbon atom and a phosphorus atom are directly bonded.

Therefore, an object of the present invention is to provide a polymer having a C—P bond.

Solution to Problem

As a result of diligent research to solve the above problems, the inventors of the present invention have found the phosphoric acid-modified polymer having a double bond, and a phosphorus substituent containing a phosphorus atom that directly bonds to a carbon atom, and thus completed the present invention.

Specifically, the inventors found that the problems described above can be solved by the following features.

1. A phosphoric acid-modified polymer containing: a phosphorus substituent containing a phosphorus atom that directly bonds to a carbon atom; and a double bond.

2. The phosphoric acid-modified polymer according to 1 above, where the phosphorus substituent is represented by Formula (1) below:

[Chemical Formula 1]

In Formula (1), $R^1$ and $R^2$ represent, the same or different, a hydrocarbon group that may have a substituent, an alkali metal, or a hydrogen atom; and the phosphorus atom bonds to the carbon atom at a position indicated by *.

3. The phosphoric acid-modified polymer according to 1 or 2 above, where the double bond is located at at least one of a main chain, a side chain, or a terminal.

4. The phosphoric acid-modified polymer according to any one of 1 to 3 above, where a backbone of the phosphoric acid-modified polymer described in any one of 1 to 3 above is a diene rubber.

5. The phosphoric acid-modified polymer according to 4 above, where the diene rubber is at least one type selected from the group consisting of polyisoprene, polybutadiene, aromatic vinyl-conjugated diene copolymer rubber, butyl rubber, ethylene propylene rubber, ethylene propylene diene rubber, and natural rubber.

6. The phosphoric acid-modified polymer according to any one of 1 to 5 above, where the carbon atom is located at at least one of a main chain, a side chain, or a terminal.

7. The phosphoric acid-modified polymer according to any one of 1 to 6 above, where the carbon atom forms a saturated bond.

Advantageous Effects of Invention

According to the present invention, a phosphoric acid-modified polymer having a phosphorus substituent containing a phosphorus atom that directly bonds to a carbon atom can be obtained.

BRIEF DESCRIPTION OF DRAWING

FIG. 1 is a chart showing the result of $^{31}$P-NMR spectrum measured using a phosphoric acid-modified polymer of an embodiment of the present application.

DESCRIPTION OF EMBODIMENTS

Phosphoric Acid-Modified Polymer

The present invention is described in detail below.

The phosphoric acid-modified polymer of the present invention (the polymer of the present invention) is a phosphoric acid-modified polymer containing: a phosphorus substituent containing a phosphorus atom that directly bonds to a carbon atom; and a double bond.

In the present invention, "phosphoric acid-modified polymer" means a modified polymer having, as a structure of phosphorus substituent, a residue obtained by eliminating one hydroxy group from phosphoric acid: $O=P(OH)_3$, an ester thereof, or a salt thereof.

In the polymer of the present invention, regarding the method of modification, an example of a preferable aspect is a polymer having been modified by a phosphorus compound described below.

It is conceived that, because the phosphorus atom directly bonds to the carbon atom, the polymer of the present invention has superior thermal stability and superior water resistance since the polymer is less likely to undergo hydrolysis, compared to the case where a polymer has a phosphate bond and a double bond.

Phosphorus Substituent

The phosphorus substituent contained in the polymer of the present invention contains a phosphorus atom that directly bonds to a carbon atom. The phosphorus substituent contains a phosphorus atom, and the phosphorus atom directly bonds to the carbon atom to form a P—C bond.

From the perspectives of excellent cost efficiency and excellent availability, the phosphorus substituent is preferably a phosphorus substituent represented by Formula (1) below.

[Chemical Formula 2]

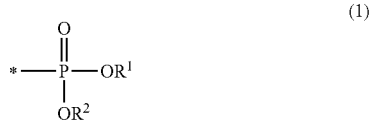

(1)

In Formula (1), $R^1$ and $R^2$ represent, the same or different, a hydrocarbon group that may have a substituent, an alkali metal, or a hydrogen atom; and the phosphorus atom bonds to the carbon atom at a position indicated by *.

The hydrocarbon group may be a straight-chain, branched, or cyclic hydrocarbon group, and may have an unsaturated bond.

The number of carbons of the hydrocarbon group may be from 1 to 30.

Examples of the hydrocarbon group include an aliphatic hydrocarbon group (which may contain an unsaturated bond; specific examples include an alkyl group, an alkenyl group, and an alkynyl group, an alicyclic hydrocarbon group (which may contain an unsaturated bond), an aromatic hydrocarbon group (preferably, an aryl group having from 6 to 24 carbons), and a combination of these.

The hydrocarbon group may contain, for example, a functional group containing a heteroatom, such as an oxygen, nitrogen, sulfur, halogen (e.g. fluorine, chlorine, bromine, and iodine), or boron atom.

Examples of the alkyl group include alkyl groups having from 1 to 30 carbons, and the alkyl group is preferably an alkyl group having from 10 to 30 carbons from the perspective of excellent thermal stability.

Examples of the alkyl group include a methyl group, an ethyl group, an octyl group, a 2-ethylhexyl group, a decyl group, a dodecyl group, a tridecyl group, an octadecyl group, an eicosyl group, an oleyl group, and a lauryl group. Among these, an ethyl group, a 2-ethylhexyl group, an octadecyl group, an oleyl group, and a lauryl group are preferred.

Examples of the aryl group having from 6 to 24 carbons include a phenyl group, a tolyl group, a nonylphenyl group, a naphthyl group, and the like.

Examples of the alkali metal include sodium and potassium.

The polymer of the present invention contains one or more phosphorus substituent in each molecule, and preferably from 1 to 100 phosphorus substituents although such preference also depends on the molecular weight.

Carbon Atom

In the present invention, the carbon atom is directly bonded to the phosphorus atom.

In the present invention, the carbon atom bonded directly to the phosphorus atom may be a carbon atom of a portion except the phosphorus substituent in the polymer of the present invention.

As an example of a preferable aspect, the carbon atom is preferably located at at least one of a main chain, a side chain, or a terminal contained in the polymer of the present invention. That is, the phosphorus substituent can bond to a carbon atom of a portion located at at least one of a main chain, a side chain, or a terminal of the polymer of the present invention.

Furthermore, as an example of a preferable aspect, the carbon atom preferably forms a saturated bond.

Double Bond

The polymer of the present invention contains a double bond.

The polymer of the present invention preferably contains the double bond in at least one of a main chain, a side chain, or a terminal.

In the polymer of the present invention, examples of the backbone thereof include diene rubber, homopolymers, such as polyolefin, polyester, polyether, and polyurethane, and copolymers of two or more types.

The backbone of the polymer of the present invention is preferably diene rubber from the perspectives of achieving excellent elasticity and excellent reactivity in sulfur crosslinking reactions of the polymer of the present invention and/or in reactions between the polymer of the present invention and a silane coupling agent.

Examples of the diene rubber include synthetic rubber, such as polyisoprene, polybutadiene, aromatic vinyl-conjugated diene copolymer rubber, butyl rubber, ethylene propylene rubber, ethylene propylene diene rubber; and natural rubber.

The diene rubbers described above are not particularly limited.

From the perspective of achieving excellent reactivity in sulfur crosslinking reactions of the polymer of the present invention and/or in reactions between the polymer of the present invention and a silane coupling agent, the polymer of the present invention may have at least one type of microstructure selected from the group consisting of a cis structure, a trans structure, a 1,2-vinyl structure, and 3,4-vinyl structure.

An example of a preferable aspect is one in which the polymer of the present invention is liquid or solid at room temperature (5 to 45° C.)

From the perspective of excellent viscosity, the polymer of the present invention has a weight average molecular weight of preferably 400 or greater, and more preferably of 1000 to 3000000. The weight average molecular weight of the polymer of the present invention is a value obtained by gel permeation chromatography (GPC) using tetrahydrofuran (THF) as a solvent, based on the calibration with polystyrene standard.

Production Method

Examples of the method of producing the polymer of the present invention include a method in which a raw material polymer, at least one type of phosphorus compound selected from the group consisting of $H_3PO_3$, $H_3PO_2$, and esters or salts of these, and a catalyst are reacted at 5 to 200° C. in an organic solvent or without a solvent.

After the reaction, the organic solvent is distilled off from the reaction solution to obtain the polymer of the present invention.

In the above description, the phosphorus compound reacts with a part of the double bond contained in the raw material polymer in the presence of a catalyst. By this reaction, a hydrogen atom and a phosphorus atom are added to the double bond described above (hydrophosphination reaction). As a result, a phosphoric acid-modified polymer in which the phosphorus substituent is bonded to the raw material polymer can be obtained.

Raw Material Polymer

The raw material polymer used in the method of producing the polymer of the present invention is not particularly limited as long as a double bond is contained. The position of the double bond is not particularly limited. For example, the position of the double bond may be similar to that of the polymer of the present invention.

Examples of the raw material polymer include diene rubber, homopolymers, such as polyolefin, polyester, polyether, and polyurethane, and copolymers of two or more types.

Among these, the raw material polymer is preferably diene rubber (hereinafter, also referred to as "raw material diene rubber").

The raw material diene rubber as the raw material polymer is not particularly limited. Examples thereof include synthetic rubber, such as polyisoprene, polybutadiene, aromatic vinyl-conjugated diene copolymer rubber, butyl rubber, ethylene propylene rubber, ethylene propylene diene rubber; and natural rubber.

The weight average molecular weight and the microstructure of the raw material polymer may be similar to those of the polymer of the present invention.

Phosphorus Compound

The phosphorus compound used in the method of producing the polymer of the present invention is not particularly limited as long as the phosphorus compound is a compound that can form a P—H bond. Examples of the phosphorus compound include at least one type selected from the group consisting of $H_3PO_3$, $H_3PO_2$, and esters or salts of these. The number of the ester bond or the number of the salt contained in the phosphorus compound may be one or more in each molecule of the phosphorus compound. The phosphorus compound may undergo tautomerization (keto-enol tautomerism). The phosphorus compound may be any tautomer (e.g. keto tautomer and enol tautomer) or mixture thereof.

The equilibrium constant of the tautomeric equilibrium depends on, for example, temperature, ester residues, solvents, and the like. The tautomer may be in a form of dimer, trimer, or oligomer by hydrogen bonding.

In the present invention, $H_3PO_3$ may be any of phosphorous acid (trihydroxy type: $P(OH)_3$) or phosphonic acid (dihydroxy type: $H(O)P(OH)_2$), which are tautomers, or may be a mixture of tautomers.

The same applies to the esters or salts of $H_3PO_3$.

The same applies to the esters or salts of $H_3PO_2$ (hypophosphorous acid and phosphinic acid are tautomers).

Examples of the ester or salt of $H_3PO_3$ include substances represented by $H_{3-n}PO_3R_n$. In the formula above, n is an integer of 1 or 2, and R is a hydrocarbon group that may have a substituent or an alkali metal. Specific examples of the hydrocarbon group that may have a substituent include hydrocarbon groups that are the same as those exemplified as the hydrocarbon groups (hydrocarbon groups that may have a substituent) of $R^1$ and $R^2$ contained in the group represented by Formula (1). The same applies to the alkali metal.

In $H_{3-n}PO_3R_n$ above, when n is 2, examples of the tautomer thereof include keto tautomers represented by Formula (I) below and enol tautomer represented by Formula (II).

[Chemical Formula 3]

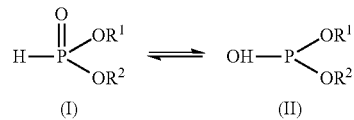

In Formula (I), $R^1$ and $R^2$ each independently represent a hydrocarbon group that may have a substituent or an alkali metal. The hydrocarbon group that may have a substituent and the alkali metal are similar to those exemplified for R above.

$R^1$ and $R^2$ in Formula (II) are similar to those exemplified for Formula (I).

In the present invention, examples of the phosphite includes phosphonate, which is a tautomer, and vice versa. The same applies to the salt of phosphorous acid and the salt of phosphonic acid. The same applies to $H_3PO_2$.

(i) Phosphite

Examples of the ester of phosphorous acid (phosphite) include dialkyl phosphite, such as dimethyl phosphite, diethyl phosphite, bis(2-ethylhexyl) phosphite, and dilauryl phosphite;

dialkenyl phosphite, such as dioleyl phosphite; and diaromatic phosphite, such as diphenyl phosphite.

The phosphorous acid diester (phosphite diester) may have one hydroxy group that bonds to a phosphorus atom.

(ii) Phosphonate

In the phosphonate, the phosphorus atom thereof can bond to, for example, a hydrogen atom or hydroxy group.

Examples of the phosphonic acid ester (phosphonate) include hydrogen phosphonic acid diester and hydrogen phosphonic acid monoester. The hydrogen phosphonic acid monoester may have one hydroxy group that bonds to a phosphorus atom.

Examples of the hydrogen phosphonic acid diester include dialkyl hydrogen phosphonate, such as dimethyl phosphonate, diethyl phosphonate, dibutyl phosphonate, dihexyl phosphonate, dioctyl phosphonate, di(2-ethylhexyl) phosphonate, didecyl phosphonate, didodecyl phosphonate (dilauryl phosphonate), and dioctadecyl phosphonate;

dialkenyl hydrogen phosphonate, such as dioleyl phosphonate; and diaromatic hydrogen phosphonate, such as diphenyl phosphonate and ditolyl phosphonate.

Examples of the hydrogen phosphonic acid monoester include monoalkyl hydrogen phosphonate, such as mono-2-ethylhexyl phosphonate, monooctyl phosphonate, and mono-1-methylheptyl phosphonate;

monoalkenyl hydrogen phosphonate, such as monooleyl phosphonate; and monoaromatic hydrogen phosphonate, such as mono-p-nonylphenyl phosphonate.

Examples of the salt of $H_3PO_3$ (e.g. metal salt) include alkali metal salts, such as sodium phosphite.

Examples of the salt of $H_3PO_2$ (e.g. metal salt) include alkali metal salts, such as sodium hypophosphite.

Among these, from the perspectives of excellent handleability, cost efficiency, raw material stability, and availability, $HPO_3R_2$ (R is similar to R of $H_{3-n}PO_3R_n$ above) is preferred, $HPO_3(alkyl)_2$ (e.g. dialkyl hydrogen phosphonate and/or dialkyl phosphite; hereinafter the same), $HPO_3(alkenyl)_2$ (e.g. dialkenyl hydrogen phosphonate and/or dialkenyl phosphite; hereinafter the same) are more preferred, and $HPO_3(ethyl)_2$, $HPO_3(2\text{-ethylhexyl})_2$, $HPO_3(lauryl)_2$, $HPO_3(oleyl)_2$ are even more preferred.

From the perspectives of excellent handleability and reactivity, the amount of phosphorus compound is preferably from 0.1 to 200 parts by mass, and more preferably from 0.2 to 150 parts by mass, per 100 parts by mass of the raw material polymer.

Catalyst

The catalyst used in the method of producing the polymer of the present invention is preferably a manganese catalyst, and more preferably a divalent or trivalent manganese catalyst.

Examples of the manganese catalyst include inorganic compounds of manganese, such as hydroxides, oxides (including complex oxide), halides (fluoride, chloride, bromide, and iodide), oxoacid salts (e.g. nitrate, sulfate, phosphate, borate, carbonate, and the like), and salts of oxo acid, isopoly acid, heteropoly acid, or salts thereof; and organic compounds of manganese, such as organic acid salts (e.g. acetate, propionate, cyanide, naphthenate, stearate, and the like) and complexes. Examples of the ligands constituting the complexes include hydroxy (OH), alkoxy (methoxy, ethoxy, propoxy, butoxy, and the like), acyl (acetyl, propionyl, and the like), alkoxycarbonyl (methoxycarbonyl, ethoxycarbonyl, and the like), acetylacetonate, cyclopentadienyl groups, halogen atoms (chlorine, bromine, and the like), CO, CN, an oxygen atom, aquo ($H_2O$), phosphorus compounds of phosphine (triarylphosphine, such as triphenylphosphine), and nitrogen-containing compounds, such as ammine ($NH_3$), NO, nitro ($NO_2$), nitrate ($NO_3$), ethylenediamine, diethylenetriamine, pyridine, and phenanthroline.

Specific examples thereof include inorganic compounds including halogenated manganese, such as manganese hydroxide, manganese oxide, manganese chloride, manganese bromide, heteropoly acids containing manganese, such as manganese nitrate, manganese sulfate, manganese phosphate, manganese carbonate, manganate, permanganate, and manganese molybdate; organic compounds including organic acid salts, such as manganese formate, manganese acetate, manganese propionate, manganese naphthenate, manganese 2-ethylhexanoate, manganese stearate, and manganese thiocyanate, and complexes such as acetylacetonate manganese. The valence of the manganese may be divalence or trivalence. The complex of manganese may be a polynuclear complex, which is bi- or more nuclear complex, containing manganese.

From the perspectives of excellent cost efficiency and production stability, the amount of the catalyst is preferably from 0.01 to 100 parts by mass, and more preferably from 0.02 to 50 parts by mass, per 100 parts by mass of the raw material polymer.

Organic Solvent

The organic solvent used in the production of the polymer of the present invention is not particularly limited. Examples thereof include organic acids, such as acetic acid and propionic acid; nitriles, such as benzonitrile; amides, such as formamide, acetoamide, dimethylformamide (DMF), and dimethylacetoamide; aliphatic hydrocarbons, such as hexane and octane; aromatic hydrocarbons, such as toluene; halogenated hydrocarbons, such as chloroform, dichloromethane, dichloroethane, carbon tetrachloride, chlorobenzene, and trifluoromethylbenzene; nitro compounds, such as nitrobenzene; and mixed solvents of these.

The used amount of the organic solvent is not particularly limited.

The phosphorus substituent of the polymer of the present invention may contain a hydroxy group. The hydroxy group may be a hydroxy group originated from the phosphorus compound used in the method of producing the polymer of the present invention. Furthermore, the phosphorus substituent may be hydrolyzed to form P—OH. A method of hydrolyzation is not particularly limited. Examples thereof include conventionally known methods.

When the 50% weight reduction temperature was measured for the polymer of the present invention and the raw material polymer used during the production of the polymer by TGA measurement (thermogravimetry), it was found that the 50% weight reduction temperatures of these were almost the same, and from this result, it was found that the polymer of the present invention had excellent thermal stability that is similar to the thermal stability of the raw material polymer.

Furthermore, taking the fact that the pyrolysis temperature of monododecyl phosphate is 212° C., the fact that the decomposition thereof also involves decomposition of the P—O bond while the C—O bond of the P—O—C bond is mainly decomposed, and the like into consideration (Thermal Decomposition of Long-chain Alkyl Phosphates, J. Oleo Sci., Japan Oil Chemists' Society, 1991, vol. 40 No. 12, pp. 1095-1099), since the 50% weight reduction temperature of the polymer of the present invention is high similarly to that of the raw material polymer as described above, it is presumed that the 50% weight reduction temperature of the polymer of the present invention is higher than that of the diene polymer having a phosphate by the P—O—C bond. Therefore, it is conceived that the polymer of the present invention has superior thermal stability and superior water resistance since the polymer is less likely to undergo hydrolysis, compared to the case where a diene polymer has a phosphate by the P—O—C bond.

Furthermore, it is conceived that the phosphorus substituent contained in the polymer of the present invention has higher acidity than that of carboxylic acid and has hydrogen bonding capability with filler surfaces. When a plurality of the oxygen atoms is contained in the phosphorus substituent, it is conceived that the hydrogen bonding capability is further enhanced.

Therefore, by blending the rubber composition to the polymer of the present invention, lower heat build-up as a result of enhancing filler dispersibility, enhancement of wet grip (WET) as a result of enhancing hydrophilicity, enhancement of toughness as a result of formability of three-dimensional network, and enhancement of wear resistance due to increase in percentage of gelation can be expected.

EXAMPLE

The present invention is described below in detail using examples but the present invention is not limited to such examples. Furthermore, in the examples, the phosphorus compound was written as phosphite, like diethyl phosphite, for convenience; however, the phosphorus compound may be any of keto-enol tautomers and may be a mixture of tautomers.

Example 1

Synthesis of Diethyl Phosphite-Modified Liquid Polyisoprene 1

In a 50 mL one-neck eggplant flask, liquid polyisoprene (product name: LIR-30, manufactured by Kuraray Co., Ltd.; number average molecular weight: 28000; 0.32 g) and toluene (manufactured by Kanto Chemical Co., Ltd.; 4 mL) were charged at room temperature. To the solution, diethyl phosphite (HP(O)(OEt)$_2$, manufactured by Tokyo Chemical Industry Co., Ltd.; 0.13 g) and manganese(II) acetate (manufactured by Osaki Industry Co., Ltd.; 0.06 g) were added dropwise and stirred at 70° C. for 3 hours. Thereafter, toluene was distilled off from the reaction solution, and diethyl phosphite-modified liquid polyisoprene 1 (brown; liquid rubber at 20° C., and this temperature condition was hereinafter the same) was quantitatively obtained.

From the $^{31}$P-NMR (nuclear magnetic resonance) spectrum of the reaction product, it was confirmed that the phosphorus atom contained in the phosphorus compound directly bonded to the carbon atom of the raw material polymer to form a phosphate group (—P(=O)(OEt)$_2$).

In the $^{31}$P-NMR (CDCl$_3$, 20° C.) of diethyl phosphite-modified liquid polyisoprene 1, δ was 33.0 (br).

For the diethyl phosphite-modified liquid polyisoprene 1, correlation of proton derived from the polymer chain (polymer chain proton) and phosphorus derived from the product were confirmed also using $^{31}$P-$^1$H NMR (HMBC method) spectrum.

It is conceived that such correlation indicates direct bonding of the phosphorus atom to the carbon atom (hereinafter the same).

Example 2

Synthesis of Diethyl Phosphite-Modified Liquid Polybutadiene 2

In a 50 mL one-neck eggplant flask, liquid polybutadiene (product name: NISSO-PB B-2000, manufactured by Nippon Soda Co., Ltd.; number average molecular weight: 2100; 0.32 g) and toluene (manufactured by Kanto Chemical Co., Ltd.; 4 mL) were charged at room temperature. To the solution, diethyl phosphite (manufactured by Tokyo Chemical Industry Co., Ltd.; 0.16 g) and manganese(II) acetate (manufactured by Osaki Industry Co., Ltd.; 0.07 g) were added dropwise and stirred at 70° C. for 3 hours. Thereafter, toluene was distilled off from the reaction solution, and diethyl phosphite-modified liquid polybutadiene 2 (brown; liquid rubber) was quantitatively obtained.

From the $^{31}$P-NMR spectrum of the reaction product, it was confirmed that the phosphorus atom contained in the phosphorus compound directly bonded to the carbon atom of the raw material polymer to form a phosphate group (—P(=O)(OEt)$_2$).

In the $^{31}$P-NMR (CDCl$_3$, 20° C.) of diethyl phosphite-modified liquid polybutadiene 2, δ was 33.5 (br).

For the diethyl phosphite-modified liquid polybutadiene 2, correlation of the polymer chain proton and phosphorus derived from the product were confirmed also using $^{31}$P-$^1$H NMR (HMBC method) spectrum.

Example 3

Synthesis of Dioleyl Phosphite-Modified Liquid Polyisoprene 3

An experiment was performed similar to Example 1 except for replacing the diethyl phosphite with dioleyl phosphite (HP(O)(OC$_{18}$H$_{35}$)$_2$, manufactured by SC Organic Chemical Co., Ltd.; 0.55 g) to quantitatively obtain dioleyl phosphite-modified liquid polyisoprene 3 (brown; liquid rubber).

From the $^{31}$P-NMR spectrum of the reaction product, it was confirmed that the phosphorus atom contained in the phosphorus compound directly bonded to the carbon atom of the raw material polymer to form a phosphate group (—P(=O)(OC$_{18}$H$_{35}$)$_2$).

In the $^{31}$P-NMR (CDCl$_3$, 20° C.) of dioleyl phosphite-modified liquid polyisoprene 3, δ was 34.1 (br).

For the dioleyl phosphite-modified liquid polyisoprene 3, correlation of the polymer chain proton and phosphorus derived from the product were confirmed also using $^{31}$P-$^1$H NMR (HMBC method) spectrum.

The weight average molecular weight of the dioleyl phosphite-modified liquid polyisoprene 3: 43000 (however, this was the data only for the portion in which the dioleyl phosphite-modified liquid polyisoprene 3 was dissolved in tetrahydrofuran (THF). Most of the dioleyl phosphite-modified liquid polyisoprene 3 was insoluble in THF)

Example 4

Synthesis of Diethyl Phosphite-Modified Polyisoprene 4

In a 50 mL one-neck eggplant flask, polyisoprene (product name: NIPOL IR 2200, manufactured by Zeon Corporation; Tg: −67° C.; 0.32 g) and toluene (manufactured by Kanto Chemical Co., Ltd.; 4 mL) were charged at room temperature. To the solution, diethyl phosphite (manufactured by Tokyo Chemical Industry Co., Ltd.; 0.13 g) and manganese(II) acetate (manufactured by Osaki Industry Co., Ltd.; 0.06 g) were added dropwise and stirred at 70° C. for 3 hours.

From the $^{31}$P-NMR spectrum of the reaction solution, it was confirmed that the phosphorus atom contained in the phosphorus compound directly bonded to the carbon atom of the raw material polymer to form a phosphate group (—P(=O)(OEt)$_2$).

Furthermore, correlation of the polymer chain proton and phosphorus derived from the product were confirmed also using $^{31}$P-$^1$H NMR (HMBC method) spectrum.

Thereafter, toluene was distilled off from the reaction solution, and diethyl phosphite-modified polyisoprene 4 (brown; solid rubber) was quantitatively obtained.

In the $^{31}$P-NMR (CDCl$_3$, 20° C.) of diethyl phosphite-modified polyisoprene 4, δ was 33.8 (br).

For the diethyl phosphite-modified polyisoprene 4 and unmodified polyisoprene (NIPOL IR 2200), the 50% weight reduction temperatures were measured by TGA measurement (thermogravimetry).

In the present specification, the TGA measurement was performed by using a simultaneous thermogravimetric-differential thermal analyzer in a nitrogen gas stream at a temperature increase of 20° C./min.

The 50% weight reduction temperature determined by the TGA measurement of the diethyl phosphite-modified polyisoprene 4 was 382° C. The 50% weight reduction temperature of the unmodified polyisoprene (NIPOL IR 2200) was 388° C. It is conceived that having almost no difference between the 50% weight reduction temperatures of these indicated that the diethyl phosphite-modified polyisoprene 4 had high thermal stability that was about the same as the thermal stability of the unmodified polyisoprene.

Example 5

Synthesis of Diethyl Phosphite-Modified Styrene-Butadiene Rubber 5

In a 50 mL one-neck eggplant flask, styrene butadiene rubber (product name: Tufdene 1000, manufactured by Asahi Kasei Chemicals Corporation; number average molecular weight: 430000; 0.32 g) and toluene (manufactured by Kanto Chemical Co., Ltd.; 4 mL) were charged at room temperature. To the solution, diethyl phosphite (manufactured by Tokyo Chemical Industry Co., Ltd.; 0.11 g) and manganese(II) naphthenate (manufactured by Tokyo Chemical Industry Co., Ltd.; 0.04 g) were added dropwise and stirred at 70° C. for 3 hours.

From the $^{31}$P-NMR spectrum of the reaction solution, it was confirmed that the phosphorus atom contained in the phosphorus compound directly bonded to the carbon atom of the raw material polymer to form a phosphate group (—P(=O)(OEt)$_2$).

Furthermore, correlation of the polymer chain proton and phosphorus derived from the product were confirmed also using $^{31}$P-$^{1}$H NMR (HMBC method) spectrum.

Thereafter, toluene was distilled off from the reaction solution, and diethyl phosphite-modified styrene butadiene rubber 5 (brown; solid rubber) was quantitatively obtained.

In the $^{31}$P-NMR (CDCl$_3$, 20° C.) of diethyl phosphite-modified styrene butadiene rubber 5, δ was 34.8 (br).

Example 6

Synthesis of Dilauryl Phosphite-Modified Natural Rubber 6

In a 50 mL one-neck eggplant flask, natural rubber (Natural Rubber TSR20, manufactured by PT. NUSIRA; 0.32 g) and toluene (manufactured by Kanto Chemical Co., Ltd.; 4 mL) were charged at room temperature. To the solution, dilauryl phosphite (HP(O)(OC$_{12}$H$_{25}$)$_2$, manufactured by SC Organic Chemical Co., Ltd.; 0.13 g) and manganese(II) acetate (manufactured by Osaki Industry Co., Ltd.; 0.03 g) were added dropwise and stirred at 70° C. for 3 hours.

From the $^{31}$P-NMR spectrum of the reaction solution, it was confirmed that the phosphorus atom contained in the phosphorus compound directly bonded to the carbon atom of the raw material polymer to form a phosphate group (—P(=O)(OC$_{12}$H$_{25}$)$_2$).

Furthermore, correlation of the polymer chain proton and phosphorus derived from the product were confirmed also using $^{31}$P-$^{1}$H NMR (HMBC method) spectrum.

Thereafter, toluene was distilled off from the reaction solution, and dilauryl phosphite-modified natural rubber 6 (brown; solid rubber) was quantitatively obtained.

In the $^{31}$P-NMR (CDCl$_3$, 20° C.) of dilauryl phosphite-modified natural rubber 6, δ was 34.4 (br).

Example 7

Synthesis of Dilauryl Phosphite-Modified Polybutadiene 7

In a 50 mL one-neck eggplant flask, polybutadiene (trade name: UBEPOL BR-150, manufactured by Ube Industries, Ltd.; Tg: −107° C.; 0.96 g) and toluene (manufactured by Kanto Chemical Co., Ltd.; 4 mL) were charged at room temperature. To the solution, dilauryl phosphite (manufactured by SC Organic Chemical Co., Ltd.; 1.48 g) and manganese(II) naphthenate (manufactured by Tokyo Chemical Industry Co., Ltd.; 0.81 g) were added dropwise and stirred at 70° C. for 3 hours.

From the $^{31}$P-NMR spectrum of the reaction solution, it was confirmed that the phosphorus atom contained in the phosphorus compound directly bonded to the carbon atom of the raw material polymer to form a phosphate group (—P(=O)(OC$_{12}$H$_{25}$)$_2$).

Furthermore, correlation of the polymer chain proton and phosphorus derived from the product were confirmed also using $^{31}$P-$^{1}$H NMR (HMBC method) spectrum.

Thereafter, toluene was distilled off from the reaction solution, and dilauryl phosphite-modified polybutadiene 7 (brown; solid rubber) was quantitatively obtained.

In the $^{31}$P-NMR (CDCl$_3$, 20° C.) of dilauryl phosphite-modified polybutadiene 7, δ was 33.7 (br).

The 50% weight reduction temperature determined by the TGA measurement of the dilauryl phosphite-modified polybutadiene 7 was 454° C. The 50% weight reduction temperature of the unmodified polybutadiene (UBEPOL BR-150) was 452° C. It is conceived that having almost no difference between the 50% weight reduction temperatures of these indicated that the dilauryl phosphite-modified polybutadiene 7 had high thermal stability that was about the same as the thermal stability of the unmodified polybutadiene.

Using the attached drawing, the phosphoric acid-modified polymer obtained in the examples is described below.

FIG. 1 is a chart showing the result of $^{31}$P-NMR spectrum measured using a phosphoric acid-modified polymer of an embodiment of the present application.

In FIG. 1, two charts are shown. The chart 20 on the bottom is the result of the diethyl phosphite-modified liquid polyisoprene 1 obtained in Example 1, and the chart 10 on the top is the result of the dilauryl phosphite-modified natural rubber 6 obtained in Example 6.

In chart 20, a peak 22 was observed around 33.0 ppm. The peak 22 was derived from a C—P bond.

In chart 10, a peak 12 was observed around 34.4 ppm. The peak 12 was derived from a C—P bond.

Note that the peaks 24 and 14 are thought to be derived from the raw material phosphite itself, hydrolysates thereof, or dimers.

REFERENCE SIGNS LIST 10, 20 Chart
12, 14, 22, 24 Peak

The invention claimed is:
1. A modified polymer comprising:
   a phosphorus substituent containing a phosphorus atom that directly bonds to a carbon atom; and
   a double bond,
   wherein the phosphorus substituent is represented by Formula (1):

[Chemical Formula 1]

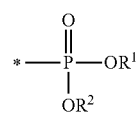

wherein, R$^1$ and R$^2$ represent, the same or different, an alkyl group having from 10 to 30 carbons, that may have a substituent; and the phosphorus atom bonds to the carbon atom at a position indicated by *.

2. The modified polymer according to claim 1, wherein the double bond is located at at least one of a main chain, a side chain, or a terminal.

3. The modified polymer according claim 1, wherein a backbone of the phosphoric acid-modified polymer is a diene rubber.

4. The modified polymer according to claim 3, wherein the diene rubber is at least one type selected from the group consisting of polyisoprene, polybutadiene, aromatic vinyl-conjugated diene copolymer rubber, butyl rubber, ethylene propylene diene rubber, and natural rubber.

5. The modified polymer according to claim 1, wherein the carbon atom is located at at least one of a main chain, a side chain, or a terminal.

6. The modified polymer according to claim 1, wherein the carbon atom forms a saturated bond.

* * * * *

UNITED STATES PATENT AND TRADEMARK OFFICE
CERTIFICATE OF CORRECTION

PATENT NO. : 10,072,102 B2
APPLICATION NO. : 15/519027
DATED : September 11, 2018
INVENTOR(S) : Yusuke Tanabe and Ryutaro Nakagawa Page 1 of 1

It is certified that error appears in the above-identified patent and that said Letters Patent is hereby corrected as shown below:

On the Title Page

Item (22):
Change "Dec. 23, 2015" to --Oct. 23, 2015--

Signed and Sealed this
Sixth Day of November, 2018

Andrei Iancu
*Director of the United States Patent and Trademark Office*